US012129204B2

(12) United States Patent
Seo (10) Patent No.: US 12,129,204 B2
(45) Date of Patent: Oct. 29, 2024

(54) MANUFACTURING METHOD OF CONSTRUCTION AGGREGATES USING INCINERATION ASH

(71) Applicant: Good Morning Enterprises, Inc., North Vancouver (CA)

(72) Inventor: Kil Won Seo, Seoul (KR)

(73) Assignee: Good Morning Enterprises, Inc., North Vancouver (CA)

( * ) Notice: Subject to any disclaimer, the term of this patent is extended or adjusted under 35 U.S.C. 154(b) by 286 days.

(21) Appl. No.: 17/550,550

(22) Filed: Dec. 14, 2021

(65) Prior Publication Data
US 2023/0073583 A1 Mar. 9, 2023

(30) Foreign Application Priority Data
Aug. 24, 2021 (KR) .......................... 10-2021-0111648

(51) Int. Cl.
| B02C 23/00 | (2006.01) |
| C04B 18/06 | (2006.01) |
| C04B 18/10 | (2006.01) |
| C04B 20/02 | (2006.01) |
| C04B 20/04 | (2006.01) |
| B02C 23/38 | (2006.01) |

(52) U.S. Cl.
CPC .......... *C04B 20/026* (2013.01); *C04B 18/062* (2013.01); *C04B 18/105* (2013.01); *C04B 20/04* (2013.01); *B02C 23/38* (2013.01)

(58) Field of Classification Search
CPC ......... B02C 23/14; B02C 23/38; B02C 23/16; B02C 19/186; Y02W 30/91
See application file for complete search history.

(56) References Cited

FOREIGN PATENT DOCUMENTS

| JP | H08323324 A | * | 12/1996 | ............ Y02W 30/91 |
| JP | H08333142 A | * | 12/1996 | ............ Y02W 30/91 |
| JP | H1036152 A | * | 2/1998 | ............ Y02W 30/91 |
| KR | 960011333 B1 | * | 8/1996 | ............ Y02W 30/91 |
| KR | 10-0145123 B1 | | 7/1998 | |
| KR | 19990031198 A | * | 5/1999 | ............ Y02W 30/91 |
| KR | 20000021762 A | * | 4/2000 | ............ Y02W 30/91 |
| KR | 10-0912893 B1 | | 8/2009 | |
| KR | 10-1459990 B1 | | 11/2014 | |
| KR | 10-2016-0027826 A | | 3/2016 | |
| KR | 10-2020-0085528 A | | 7/2020 | |
| KR | 10-2206677 B1 | | 1/2021 | |
| KR | 10-2244600 B1 | | 4/2021 | |

\* cited by examiner

*Primary Examiner* — Faye Francis
(74) *Attorney, Agent, or Firm* — IP Legal Services, LLC (57) ABSTRACT

The present invention relates to a manufacturing method of construction aggregates using incineration ash, in which aggregates for construction, such as gravel or sand are manufactured using incineration ashes produced during the incineration process of household waste, food waste, sewage waste, construction and industrial waste, etc. while realizing eco-friendly manufacturing environments, reducing costs through successive steps and reducing and discharging harmful gases produced during firing.

12 Claims, 7 Drawing Sheets

MANUFACTURING METHOD OF CONSTRUCTION AGGREGATES USING INCINERATION ASH

CROSS REFERENCE TO PRIOR APPLICATIONS

The present application claims priority under 35 U.S.C. § 119 to Korean Patent Application No. 10-2021-0111648 (filed on Aug. 24, 2021).

BACKGROUND OF THE INVENTION

Technical Field

The present invention relates to a manufacturing method of construction aggregates using incineration ash, and more particularly, to manufacturing method of construction aggregates using incineration ash, in which aggregates for construction such as gravel or sand are manufactured using incineration ash produced during the incineration process of household waste, food waste, sewage waste, construction and industrial waste, etc., while realizing eco-friendly manufacturing environments, reducing costs through successive steps, and reducing and discharging harmful gases produced during firing.

Background Art

In general, household waste, food waste sludge, sewage waste sludge, and construction and industrial waste sludge are disposed of through drying, incineration, landfill, etc., and environmental problems for the treatment thereof have been socially emerging.

Therefore, in recent years, various recycling technologies such as manufacturing construction materials using household waste or various waste sludge have been studied.

However, the recycling technology using such waste sludge has a problem in that the configuration of the recycling device varies depending on the type of waste and it is difficult to process a large amount.

In addition, in the treatment process, there is still a problem in that harmful gases such as carbon dioxide, nitrogen oxide NOx, sulfur oxide SOx, etc. due to heating and combustion are discharged, thereby disturbing the environment.

In addition, there is still a problem in that harmful gases such as carbon dioxide, nitrogen oxide NOx, sulfur oxide SOx, etc. are emitted by heating and combustion during the treatment process, thereby disturbing the environment.

PRIOR ART DOCUMENTS

Patent Documents

Korean Patent Publication No. 10-2206677 (Registered on 18 Jan. 2021)
Korean Patent Publication No. 10-2244600 (Registered on 20 Apr. 2021)
Korean Patent Publication No. 10-1459990 (Registered on 3 Nov. 2014)
Korean Patent Publication No. 10-0912893 (Registered on 12 Aug. 2009)

SUMMARY

Technical Problems

The present invention has been derived to solve the problems of the prior art described above, and has an objective to provide a manufacturing method of construction aggregates using incineration ash, in which aggregates for construction such as gravel or sand are manufactured using incineration ash produced during the incineration process of household waste, food waste, sewage waste, construction and industrial waste, etc., while realizing eco-friendly manufacturing environments, reducing costs through successive steps, and reducing and discharging harmful gases produced during firing.

Technical Solutions

In order to achieve the objective described above and solve the technical problems, there is provided a manufacturing method of construction aggregates using incineration ash, including: a first step of separating foreign substances such as ferrous components and non-ferrous components contained in continuously supplied incineration ash raw materials; a second step of crushing the incineration ash raw materials discharged after the first step and selecting the crushed incineration ash raw materials according to a certain size so as to produce basic incineration ash raw materials; a third step of mixing inorganic sludge and the basic incineration ash raw materials produced through the second step so as to produce basic raw materials for construction aggregates; a fourth step of vacuum extruding the basic raw materials for construction aggregates discharged through the third step, and cutting the same according to a predetermined standard so as to form basic elements for construction aggregates; a fifth step of filling a saggar with a predetermined amount of the basic elements for construction aggregates discharged through the fourth step, sealing the saggar with a lid, and then transferring the saggar; a sixth step of drying the saggar transferred after the fifth step so that the basic elements for construction aggregates filled inside the saggar has a moisture content set before sintering; a seventh step of firing the saggar dried through the sixth step and forming the basic elements for construction aggregates filled inside the saggar into construction aggregate elements; an eighth step of reducing harmful gas produced in the firing process of the seventh step and discharging the saggar to the outside; a ninth step of opening the lid of the saggar discharged through the seventh step and removing the construction aggregate elements filled inside the saggar; and a tenth step of crushing the construction aggregate elements discharged through the ninth step, and separating the particles of the crushed construction aggregate elements into construction aggregate gravel and construction aggregate sand.

According to the present invention, the second step includes a primary crushing step of crushing the incineration ash raw materials, a primary selecting step for selecting particles within 50 mm after the primary crushing of the incineration ash raw materials, a secondary crushing step of secondarily crushing the incineration ash raw materials again after the primary selecting step, and a secondary selecting step of selecting the particles within 20 mm after the secondary crushing step so as to produce basic incineration ash raw materials.

In addition, according to the present invention, in the third step, the basic incineration ash raw materials have a moisture content of 20-30%, and the inorganic sludge has moisture content of about 10-15%.

Furthermore, according to the present invention, in the third step, in addition to the basic incineration ash raw materials and the inorganic sludge, clay or minerals are additionally mixed or blended in a certain ratio so as to produce basic raw materials for construction aggregates.

Besides, according to the present invention, the third step additionally includes a secondary mixing step for vertically raising, through a bucket conveyor, the basic raw materials for construction aggregates discharged through the mixer and then dropping the basic raw materials for construction aggregates directly downward through the discharge hole of the bucket conveyor so that the basic raw materials for construction aggregates are introduced into a vacuum extruder so as to be secondarily mixed.

Herein, according to the present invention, in the fourth step, the vacuum extruder includes an input hopper into which the basic raw materials for construction aggregates are introduced, and a front end part for forming and discharging basic elements for construction aggregates, and wherein the basic elements for construction aggregates are formed through extrusion by using the vacuum extruder, in which a forming part having a plurality of discharge holes is installed in the front end part, and a cross bar-shaped cutting part and a drive part for driving the cross bar-shaped cutting part to rotate are installed in the center of the forming part.

In addition, according to the present invention, the saggar of the fifth step includes a main body having a storage space and the lid for sealing the main body.

Furthermore, according to the present invention, in the sixth step, a sixth conveyor for transferring the saggar and a dryer formed on the sixth conveyor are provided, wherein the dryer includes a slow cooling part, which is installed at a saggar introduction stage so as to preliminarily dry the basic elements for construction aggregates before sintering and lowers the temperature of the basic elements for construction aggregates to a temperature between 350-450° C., and a drying part for drying the basic elements for construction aggregates, slowly cooled by the slow cooling part, at a temperature of 100-150° C. for 60 to 100 minutes.

Herein, according to the present invention, the drying part includes a water-cooling type fin cooler and a fan filter unit in order to carry out cooling treatment including thermal and chemical annealing and to induce the release of water vapor and gas.

In addition, according to the present invention, in the seventh step, a seventh conveyor for transferring the saggar and a firing kiln part formed on the seventh conveyor are provided, wherein the firing kiln part includes an input and preheating section for preheating a saggar to a predetermined temperature, a temperature rising section for raising the temperature of the saggar to 1100-1200° C. after the input and preheating section, a temperature maintaining section for constantly maintaining the temperature of the saggar raised through the temperature rising section, a cooling section for cooling the saggar to a predetermined temperature or less after firing is progressed through the temperature maintaining section, and a room temperature cooling and discharge section for discharging the saggar to the outside after cooling the saggar to room temperature after the cooling section.

Furthermore, according to the present invention, in the eighth step, an exhaust gas reduction device is provided, wherein in order to reduce harmful exhaust gas such as carbon dioxide, nitrogen oxides and sulfur oxides produced during firing of the firing kiln part, the exhaust gas reduction device is configured to reduce exhaust gas by using one of a combustion method, an adsorption method, an absorption method, a microorganism treatment method, an ozone oxidation method, and a cooling condensation method, or two or more thereof in combination.

Meanwhile, according to the present invention, in the tenth step, a crusher and a separator are provided so that the crusher crushes the construction aggregate elements provided from the saggar and the separator separates the crushed construction aggregate elements discharged through the crusher into construction aggregate gravel and construction aggregate sand.

Advantageous Effects

As described above, aggregates for construction, such as gravel or sand are manufactured using incineration ashes produced during the incineration process of household waste, food waste, sewage waste, construction and industrial waste, etc. while reducing costs through successive steps and realizing eco-friendly manufacturing environments by reducing and discharging harmful gases produced during firing.

DETAILED DESCRIPTION

Hereinafter, preferred embodiments of the present invention will be described in detail with reference to the accompanying drawings.

First, in adding reference signs to the components of each drawing, it should be noted that only the same components are denoted by the same reference signs as much as possible even though they are indicated on different drawings. In addition, in describing the present invention, if it is determined that a detailed description of a related known function or configuration may unnecessarily obscure the gist of the present invention, the detailed description thereof will be omitted.

Figure 1:
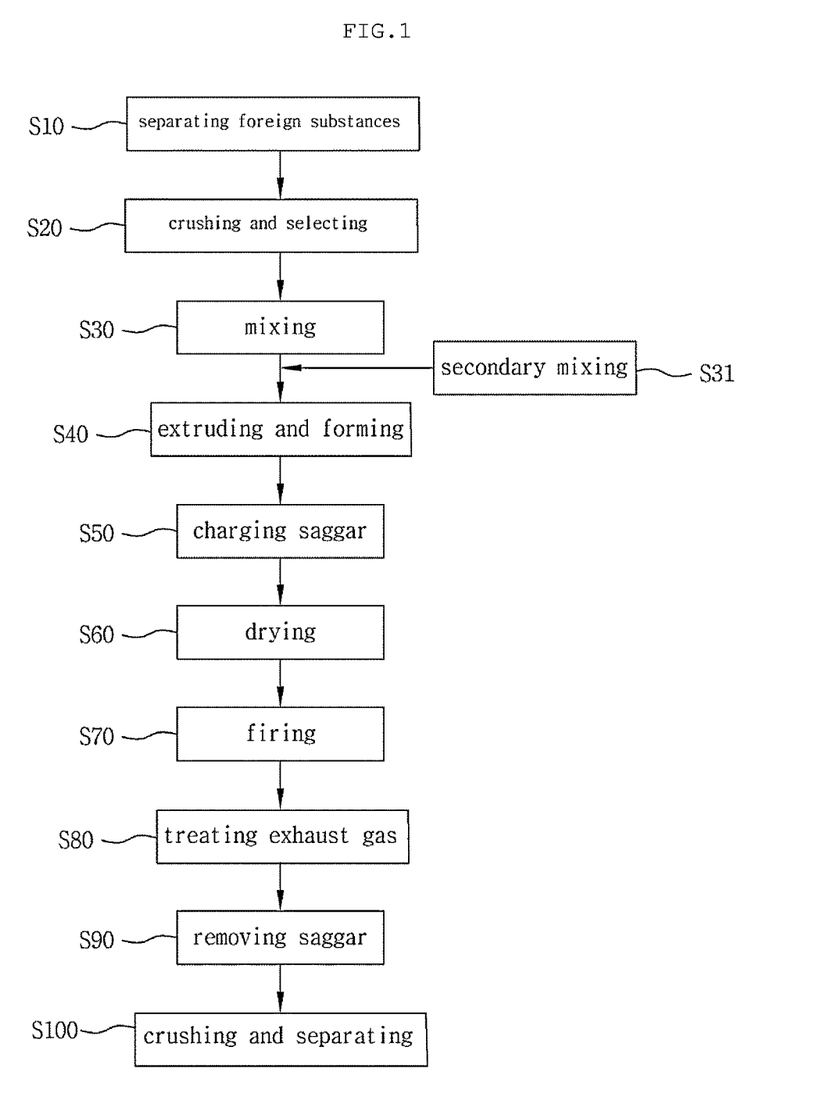
FIG. 1 is a flow chart showing the steps of a manufacturing method of construction aggregates using incineration ash according to the present invention.

FIG. 1 is a flow chart showing the steps of a manufacturing method of construction aggregates using incineration ash according to the present invention.

Referring to FIG. 1, a manufacturing method of construction aggregates using incineration ash, according to the present invention, includes a first step S10 of separating foreign substances such as ferrous components and non-ferrous components contained in continuously supplied incineration ash raw materials, a second step S20 of crushing the incineration ash raw materials discharged after the first step S10 and selecting the crushed incineration ash raw materials according to a certain size so as to produce basic incineration ash raw materials, a third step S30 of mixing inorganic sludge and the basic incineration ash raw materials produced through the second step S20 so as to produce basic raw materials for construction aggregates, a fourth step S40 of vacuum extruding the basic raw materials for construction aggregates discharged through the third step S30, and cutting the same according to a predetermined standard so as to form basic elements for construction aggregates, a fifth step S50 of filling a saggar with a predetermined amount of the basic elements for construction aggregates discharged through the fourth step S40, sealing the saggar with a lid, and then transferring the saggar, a sixth step S60 of drying the saggar transferred after the fifth step S50 so that the basic elements for construction aggregates filled inside the saggar has a set moisture content, a seventh step S70 of firing the saggar dried through the sixth step S60 and forming the basic elements for construction aggregates filled inside the saggar into construction aggregate elements, an eighth step S80 of reducing harmful gas produced in the firing process of the seventh step S70 and discharging the saggar to the outside, a ninth step S90 of opening the lid of the saggar discharged through the seventh step S70 and removing the construction aggregate elements filled inside the saggar out of the saggar, and a tenth step S100 of crushing the construction aggregate elements discharged through the ninth step S90, and separating the particles of the crushed construction aggregate elements into construction aggregate gravel and construction aggregate sand.

The first step S10 is a step for separating foreign substances such as ferrous components and non-ferrous components contained in continuously supplied incineration ash raw materials, wherein the incineration ash raw materials may be incineration ash generated in the incineration process of various wastes including household waste, food waste, sewage waste, construction and industrial waste, and the like.

Figure 3:
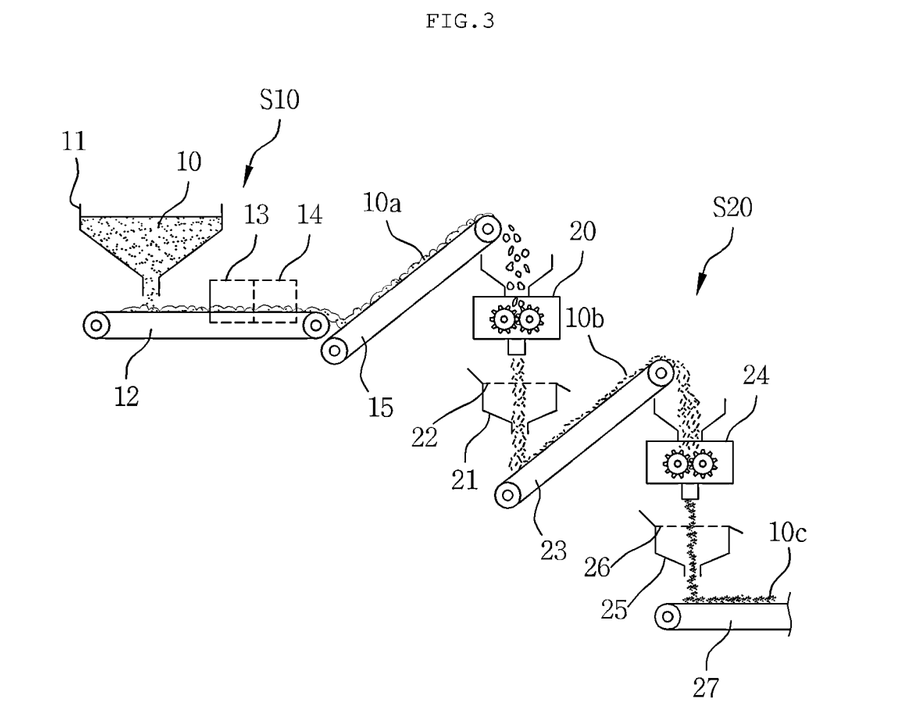
FIG. 3 is a configuration diagram of a first step and a second step according to the present invention.

The incineration ash raw materials 10 can be fed continuously through a hopper 11 and a first conveyor 12, as shown in FIG. 3.

In addition, a magnetic separator 13 and an eddy current separator 14 are installed on the first conveyor 12 so that the magnetic separator 13 separates metal foreign substances such as reinforcing bars or iron pieces included in the incineration ash raw materials 10 that are continuously moving and the eddy current separator 14 separates non-ferrous metal.

Figure 2:
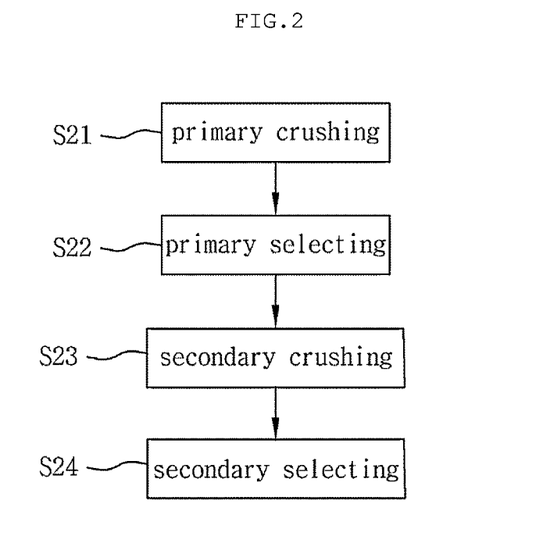
FIG. 2 is a flow chart showing the detailed steps of a second step according to the present invention.

The second step S20 is a step for crushing the incineration ash raw materials 10 discharged after the first step S10 and selecting the crushed incineration ash raw materials 10 according to a certain size so as to produce basic incineration ash raw materials. The second step 20 includes, as shown in FIG. 2, the primary crushing step S21 of crushing the incineration ash raw materials 10, the primary selecting step S22 for selecting particles within 50 mm after the primary crushing of the incineration ash raw materials, the secondary crushing step S23 of secondarily crushing the incineration ash raw materials again after the primary selecting step S22, and the secondary selecting step S24 of selecting particles within 20 mm after the secondary crushing step so as to produce basic incineration ash raw materials 10c.

In the second step S20, as shown in FIG. 3, incineration ash raw materials 10a which are discharged after foreign substance separation in the first step S10 are transferred through a second conveyor 15, wherein when the incineration ash raw materials 10a are put into a first crusher 20, the inputted incineration ash raw materials 10a are crushed and then introduced into a first separator 22 (step S21).

Among the incineration ash raw materials 10a introduced into the first separator 21, incineration ash raw materials 10b of 50 mm or less is selected through a filtering net 22, and the selected incineration ash raw materials 10b are transferred through a third conveyor 23 (step S22).

The incineration ash raw materials 10b transferred through the third conveyor 23 are put into a second crusher 24, and the inputted incineration ash raw materials 10b are crushed and then introduced into a second separator 25 (step S23).

From the incineration ash raw materials 10b introduced into the second separator 25, basic incineration ash raw materials 10c of 20 mm or less are selected through a filtering net 26, and the basic incineration ash raw materials 10c are transferred to the third step S40 (step S24).

Herein, a jaw crusher may be used as the primary crusher 20, and an impact crusher may be used as the secondary crusher 24.

Figure 4:
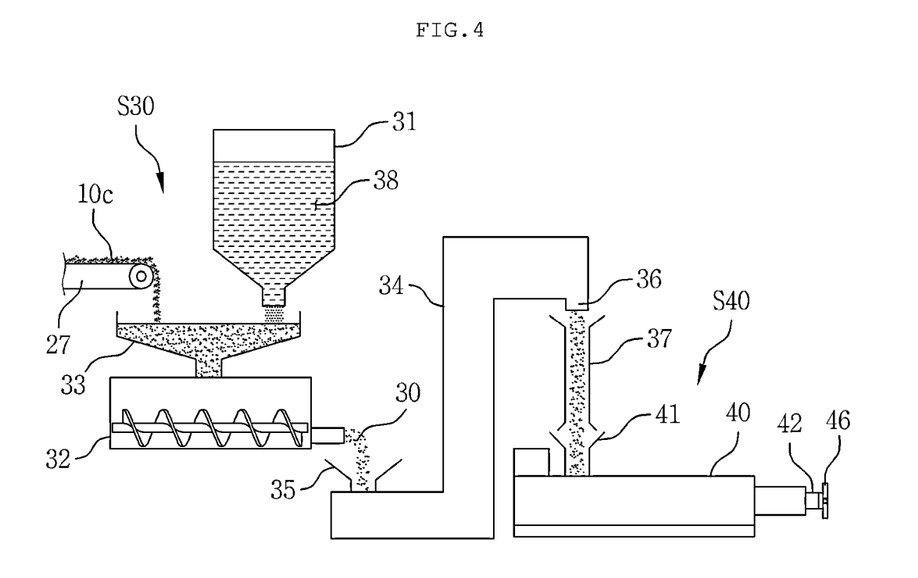
FIG. 4 is a configuration diagram of a third step and a fourth step according to the present invention.

The third step S30 is a step for mixing inorganic sludge and the basic incineration ash raw materials produced through the second step S20 so as to produce basic raw materials for construction aggregates. Referring to FIG. 4, the basic incineration ash raw materials 10c provided through a fourth conveyor 27 and inorganic sludge 38 stored in a storage container 31 are put into a mixer 32 through a hopper 33 and mixed so that basic raw materials 30 for construction aggregates are produced.

Herein, the incineration ash basic raw materials 10, 10c have a moisture content of about 20-30%, and the inorganic sludge 38 has a moisture content of about 10-15%.

In the case of incineration ash raw materials, water is sprayed to suppress the ignition and dust of incineration ash in an incinerator, and thus the moisture content is caused by such injection of water. Also, in the case of the inorganic sludge 38, water is sprayed on the sludge generated during the processing of raw stones so as to lower frictional force in the process of, for example, cutting the raw stones and thus the moisture content is caused by such injection of water.

In the third step S30, in addition to the basic incineration ash raw materials 10c and the inorganic sludge 38, clay or minerals having great plasticity may be additionally mixed or blended in a certain ratio so as to produce the basic raw materials 30 for construction aggregates.

As the mixer 32, a dual shaft double ribbon type blender may be used.

The dual shaft double ribbon type blender may be configured to install double ribbons on a single shaft and then install two of these dual ribbon mixing shafts in a single mixing chamber so as to efficiently perform mixing operation in a short time, wherein the double ribbons are formed of a spiral ribbon having a small diameter and a split type ribbon having a diameter larger than that of the spiral ribbon and divided into parts each of size 90° so as to be installed with a phase difference of 180° from each other.

In addition, when additionally mixing the materials of the other components, a kneader may be used.

Meanwhile, the third step S30 may additionally include a secondary mixing step for vertically raising, through a bucket conveyor 34, the basic raw materials 30 for construction aggregates discharged through the mixer 32 and then dropping the basic raw materials 30 for construction aggregates directly downward through the discharge hole 36 of the bucket conveyor 34 so that the basic raw materials 30 for construction aggregates are introduced into a vacuum extruder 40 through a guide pipe 37 so as to be secondarily mixed.

The secondary mixing step densifies the mixed tissue.

Herein, the bucket conveyor 34 also serves as a conveying means to reduce the installation space.

The fourth step S40 is a step for vacuum extruding the basic raw materials 30 for construction aggregates discharged through the third step S30, wherein the basic raw materials 30 for construction aggregates are cut according to a predetermined standard so as to form basic elements for construction aggregates, and the vacuum extruder 40 is provided as shown in FIG. 4.

The vacuum extruder 40 includes an input hopper 41 into which the basic raw materials 30 for construction aggregates are introduced, and a front end part 42 for forming and discharging basic elements 31 for construction aggregates.

Figure 5A:
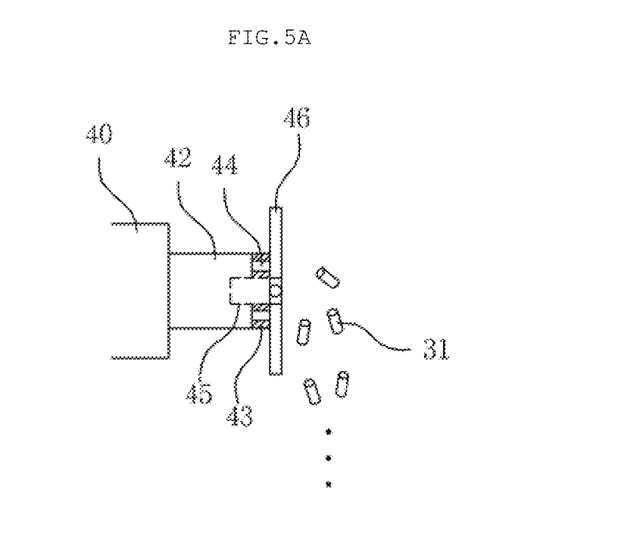
FIGS. 5A and 5B are views for showing the front end part of a vacuum extruder according to a fourth step of the present invention.
Figure 5B:
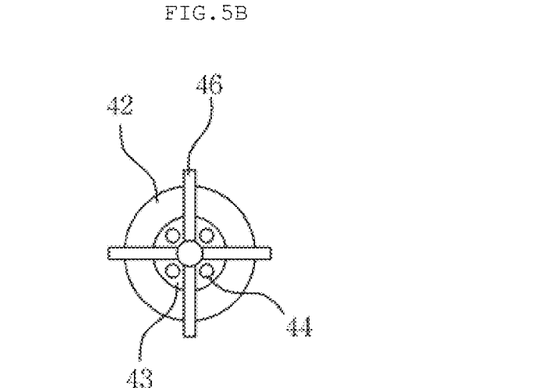

Referring to FIGS. 5A and 5B, the front end part 42 is provided with a forming part 43 having a plurality of discharge holes 44, and a cross bar-shaped cutting part 46 and a drive part 45 for driving the cross bar-shaped cutting part 46 to rotate are installed in the center of the forming part 43.

Therefore, looking at the operation, the basic raw materials 30 for construction aggregates introduced into the vacuum extruder 40 through the input hopper 41 are melted and then continuously extruded to the outside through the discharge hole 44 of the forming part 43, wherein the cutting part 46 continuously cuts the basic raw materials 30 for construction aggregates to a predetermined length while continuously rotating.

In addition, when the vacuum extruder 40 appropriately adjusts the particle size of a preform having a porosity of 35 to 40% while vacuum extruding the basic raw materials 30 for construction aggregates, the vacuum extruder 40 can control the particle size up to 28%.

Figure 6:
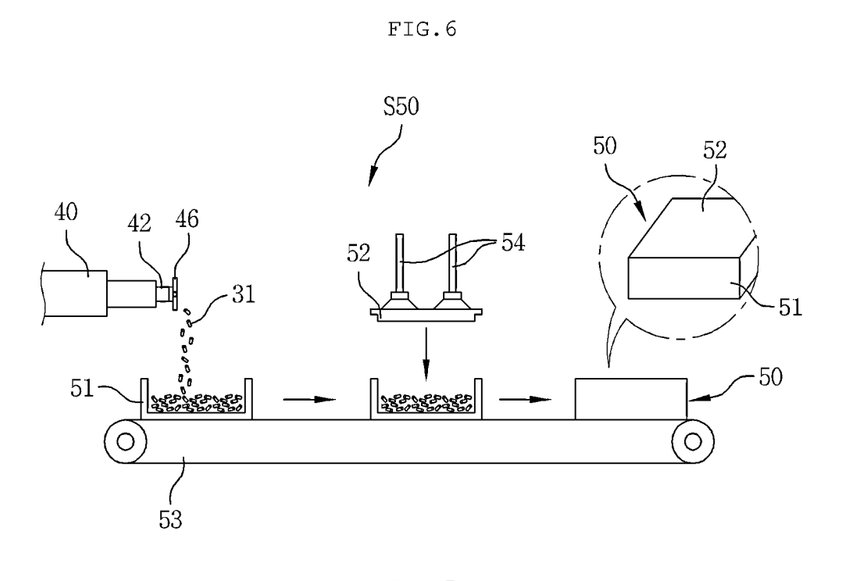
FIG. 6 is a configuration diagram of a fifth step according to the present invention.

The fifth step S50 is a step for filling the saggar with a predetermined amount of the basic elements 31 for construction aggregates discharged through the fourth step S40, sealing the saggar with the lid, and then transferring the saggar, wherein the saggar 50 includes a main body 51 having a storage space and the lid 52 for sealing the main body 51, as shown in FIG. 6.

Looking at the fifth step S50, the basic elements 31 for construction aggregates discharged through the vacuum extruder 40 of the fourth step S40 are charged in a certain amount inside the main body 51 of the saggar 50 seated on a fifth conveyor 53.

When the saggar main body 51 is filled with a certain amount of the basic elements 31 for construction aggregates, the main body 51 is transferred through the fifth conveyor 53, and the lid 52 is coupled by the operation of an adsorber 54.

The saggar 50 to which the lid 52 is coupled is transferred to a dryer 60 through the fifth conveyor 53.

Herein, the saggar 50 serves to uniformly and continuously move the basic elements 31 for construction aggregates filled therein and, at the same time, to provide stability during subsequent drying and firing steps.

Figure 7:
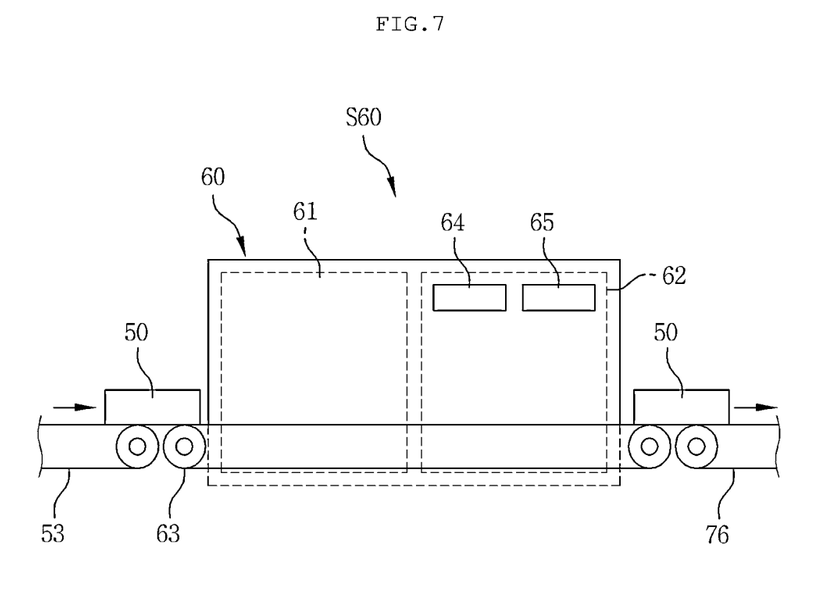
FIG. 7 is a configuration diagram of a sixth step according to the present invention.

The sixth step S60 is a step for drying the saggar 50 transferred after the fifth step S50 so that the basic elements 31 for construction aggregates filled inside the saggar 50 can be preliminarily dried before sintering, that is, a preliminary step before sintering, which includes preliminary reactions for imparting properties suitable for intended uses and producing desired compounds by reacting the mixing ingredients of the basic elements 31 for construction aggregates with each other, combustion and decomposition of a binder, and removal of gaseous products of oxidation.

In the sixth step, a sixth conveyor 63 for transferring the saggar 50 and the dryer 60 formed on the sixth conveyor 63 are provided, as shown in FIG. 7.

The dryer 60 is a device that reduces a moisture content within a certain level through drying and includes a slow cooling part 61 and a drying part 62.

The slow cooling part 61 is installed at a saggar 50 introduction stage and carries out slow cooling so as to lower the temperature of the basic elements 31 for construction aggregates to a temperature between 350-450° C.

The drying part 62 dries the basic elements 31 for construction aggregates, slowly cooled by the slow cooling part 61, at a temperature of 100-150° C. for 60 to 100 minutes.

The drying part 62 may include a water-cooling type fin cooler 64 and a fan filter unit 65 in order to carry out cooling treatment including thermal and chemical annealing and to induce the release of water vapor and gas.

Figure 8:
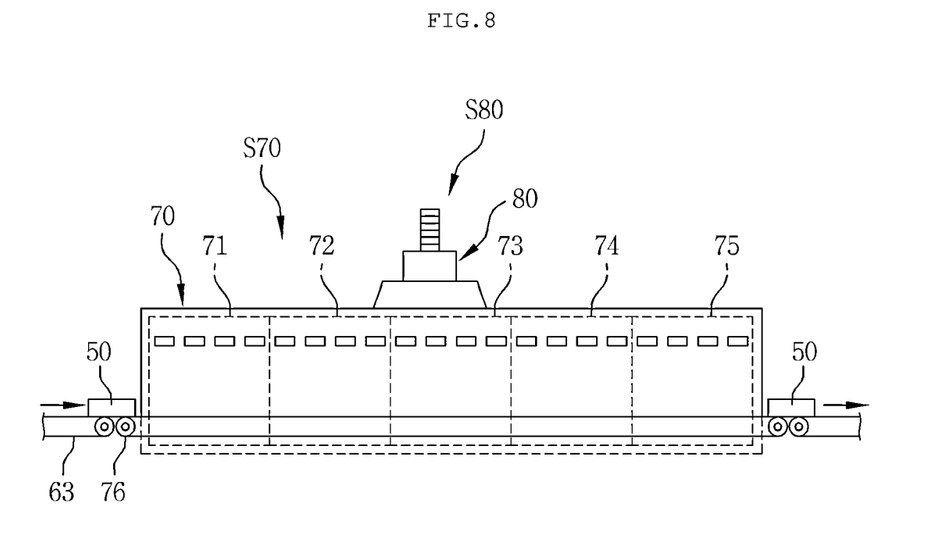
FIG. 8 is a configuration diagram of a seventh step and an eighth step according to the present invention.

The seventh step S70 is a step for firing the saggar 50 dried through the sixth step S60 and forming the basic elements 31 for construction aggregates filled inside the saggar 50 into construction aggregate elements, wherein a seventh conveyor 76 for transferring the saggar 50 and a firing kiln part 80 formed on the seventh conveyor 76 are provided, as shown in FIG. 8.

The firing kiln part 80 is a kiln for performing the firing step, wherein the sintering temperature is related to a chemical composition, and the firing kiln part 80 includes an input and preheating section 71, a temperature rising section 72, a temperature maintaining section 73, a cooling section 74, a room temperature cooling and discharging section 75.

The input and preheating section 71 is a section, in which the saggar 50 discharged through the drying part 60 is inputted and preheated to a predetermined temperature, the temperature rising section 72 is a section in which the temperature of the saggar 50 is increased to a temperature of 1100-1200° C. after the input and preheating section 71, the temperature maintaining section 73 is a section in which the temperature of the saggar 50 raised through the temperature rising section 72 is constantly maintained, the cooling section 74 is a section in which the saggar 50 is cooled to a predetermined temperature or less after firing is carried out through the temperature maintaining section 73, and the room temperature cooling and discharging section 75 is a section, in which the saggar 50 is cooled to room temperature after the cooling section 74 and then discharged to the outside.

In the cooling section 74, the cooling rate affects the stress state of the calcined crystal size, wherein, in particular, when a glass phase is formed in the raw materials, the internal stress remains, so a sensitive cooling rate is required.

The firing kiln part 70 may be formed as a continuous fast firing kiln (Roller Hearth Kiln RHK) that is a straight kiln.

The eighth step S80 is a step for reducing harmful gas produced in the firing process of the seventh step S70 and discharging the saggar to the outside, wherein an exhaust gas reduction device 80 is provided and installed on the firing kiln part 70, as shown in FIG. 8.

The exhaust gas reduction device 80 is configured to reduce exhaust gas by using one of a combustion method, an adsorption method, an absorption method, a microorganism treatment method, an ozone oxidation method, a cooling condensation method, etc. or two or more thereof in combination, in order to reduce harmful exhaust gas such as carbon dioxide, nitrogen oxides NOx and sulfur oxides SOx produced during firing of the firing kiln part 70.

Figure 9:
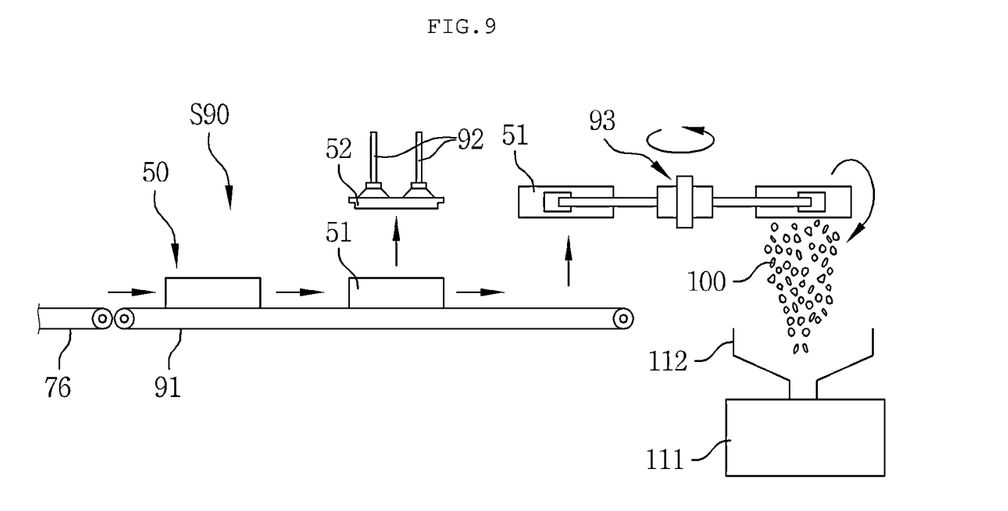
FIG. 9 is a configuration diagram of a ninth step according to the present invention.

The ninth step S90 is a step for opening the lid of the saggar 50 discharged through the seventh step S70 and removing the construction aggregate elements filled inside the saggar 50 out of the saggar 50, wherein the saggar 50 fired and discharged through the firing kiln part 70 of the eighth step S80 is placed on an eighth conveyor 91, as shown in FIG. 9.

The saggar 50 is transferred through the eighth conveyor 91, and the lid 52 is opened by the operation of the adsorber 92.

The saggar 50 with the lid 52 opened is then overturned by the operation of a robot arm 93, and the construction aggregate elements 100 charged in the saggar 50 fall down.

Figure 10:
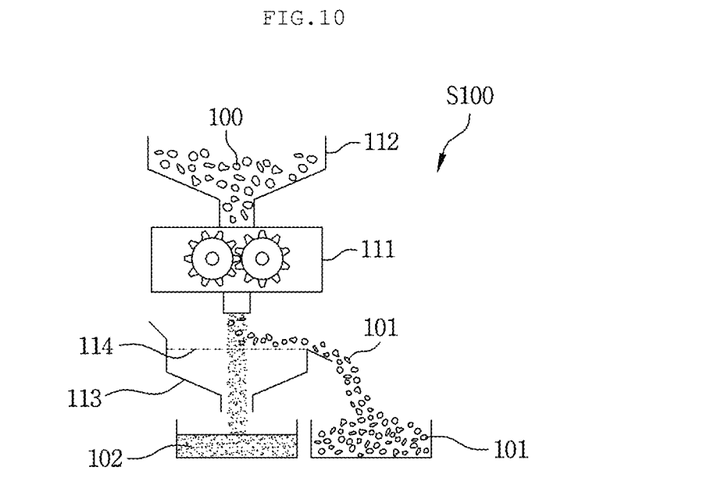
FIG. 10 is a configuration diagram of a tenth step according to the present invention.

The construction aggregate elements 100 fall down are guided to a crusher 111 of the tenth step S100.

The tenth step S100 is a step for crushing the construction aggregate elements 100 discharged through the ninth step S90, and separating the particles of the crushed construction aggregate elements 100 into construction aggregate gravel and construction aggregate sand, wherein the crusher 111 and a separator 113 are provided, as shown in FIG. 10, so that the crusher 111 crushes the construction aggregate elements 100 provided from the saggar 50 and the separator 113 separates the crushed construction aggregate elements 100 discharged through the crusher 111 into construction aggregate gravel 101 and construction aggregate sand 102 through a filtering net 114.

Therefore, construction aggregate elements 100 of the present invention are finally formed into the construction aggregate gravel 101 and the construction aggregate sand 102.

Figure 11:
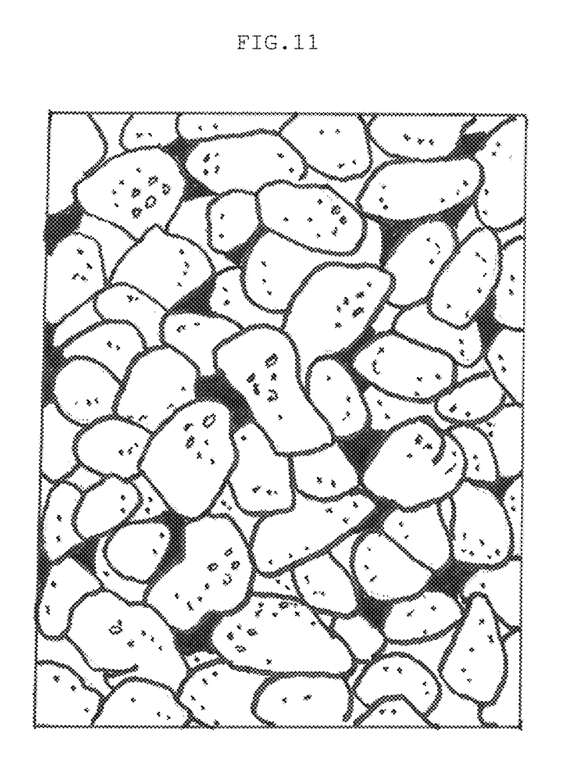
FIG. 11 is a real photograph of construction aggregate elements according to the present invention.

FIG. 11 is a real photograph of the construction aggregate gravel 101 according to the present invention.

As described above, according to the present invention, it is possible to manufacture aggregates for construction, such as gravel or sand by using incineration ashes produced during the incineration process of household waste, food waste, sewage waste, construction and industrial waste, etc. while reducing costs through successive steps and realizing eco-friendly manufacturing environments by reducing and discharging harmful gases produced during firing.

Although limited embodiments of the present invention have been described hereinabove, those skilled in the art should note that the present invention is not limited thereto and various embodiments can be expected.

| Brief Explanation of Reference Symbols | |
|---|---|
| 10, 10a, 10b: | incineration ash raw materials |
| 10c: | basic incineration ash raw materials |
| 13: | magnetic separator |
| 14: | eddy current separator |
| 20: | first crusher |
| 21: | first separator |
| 24: | second crusher |
| 25: | second separator |
| 32: | mixer |
| 34: | bucket conveyor |
| 38: | inorganic sludge |
| 40: | vacuum extruder |
| 43: | forming part |
| 44: | discharge hole |
| 46: | cutting part |
| 50: | saggar |
| 51: | main body |
| 52: | lid |

| Brief Explanation of Reference Symbols | |
|---|---|
| 60: | dryer |
| 61: | slow cooling part |
| 62: | drying part |
| 70: | firing kiln part |
| 80: | exhaust gas reduction device |
| 111: | crusher |
| 112: | separator |

What is claimed is:

1. A manufacturing method of construction aggregates using incineration ash, comprising:
    a first step of separating foreign substances including ferrous components and non-ferrous components contained in continuously supplied incineration ash raw materials;
    a second step of crushing the incineration ash raw materials discharged after the first step and selecting the crushed incineration ash raw materials according to a certain size so as to produce basic incineration ash raw materials;
    a third step of mixing inorganic sludge and the basic incineration ash raw materials produced through the second step so as to produce basic raw materials for construction aggregates;
    a fourth step of vacuum extruding the basic raw materials for construction aggregates discharged through the third step, and cutting the same according to a predetermined standard so as to form basic elements including gravel and sand for construction aggregates;
    a fifth step of filling a saggar with a predetermined amount of the basic elements including gravel and sand for construction aggregates discharged through the fourth step, sealing the saggar with a lid, and then transferring the saggar;
    a sixth step of drying the saggar transferred after the fifth step so that the basic elements including gravel and sand for construction aggregates filled inside the saggar has a moisture content set before sintering;
    a seventh step of firing the saggar dried through the sixth step and forming the basic elements including gravel and sand for construction aggregates filled inside the saggar into construction aggregate elements;
    an eighth step of reducing harmful gas produced in the firing process of the seventh step and discharging the saggar to the outside;
    a ninth step of opening the lid of the saggar discharged through the seventh step and removing the construction aggregate elements filled inside the saggar out of the saggar; and
    a tenth step of crushing the construction aggregate elements discharged through the ninth step, and separating the particles of the crushed construction aggregate elements into construction aggregate gravel and construction aggregate sand.

2. The manufacturing method of construction aggregates using incineration ash according to claim 1, wherein the second step includes:
    a primary crushing step of crushing the incineration ash raw materials;
    a primary selecting step for selecting particles within 50 mm after the primary crushing of the incineration ash raw materials;

a secondary crushing step of secondarily crushing the incineration ash raw materials again after the primary selecting step; and a secondary selecting step of selecting the particles within 20 mm after the secondary crushing step so as to produce basic incineration ash raw materials.

3. The manufacturing method of construction aggregates using incineration ash according to claim 1, wherein in the third step, the basic incineration ash raw materials have a moisture content of 20-30%, and the inorganic sludge has a moisture content of about 10-15%.

4. The manufacturing method of construction aggregates using incineration ash according to claim 1, wherein in the third step, in addition to the basic incineration ash raw materials and the inorganic sludge, clay or minerals are additionally mixed or blended in a certain ratio so as to produce basic raw materials for construction aggregates.

5. The manufacturing method of construction aggregates using incineration ash according to claim 1, wherein the third step additionally includes a secondary mixing step of vertically raising, through a bucket conveyor, the basic raw materials for construction aggregates discharged through the mixer and then dropping the basic raw materials for construction aggregates directly downward through the discharge hole of the bucket conveyor so that the basic raw materials for construction aggregates are introduced into a vacuum extruder so as to be secondarily mixed.

6. The manufacturing method of construction aggregates using incineration ash according to claim 1, wherein in the fourth step, the vacuum extruder includes an input hopper into which the basic raw materials for construction aggregates are introduced, and a front end part for forming and discharging basic elements including gravel and sand for construction aggregates, and wherein the basic elements including gravel and sand for construction aggregates are formed through extrusion by using the vacuum extruder, in which a forming part having a plurality of discharge holes is installed in the front end part, and a cross bar-shaped cutting part and a drive part for driving the cross bar-shaped cutting part to rotate are installed in the center of the forming part.

7. The manufacturing method of construction aggregates using incineration ash according to claim 1, wherein the saggar of the fifth step includes a main body having a storage space and the lid for sealing the main body.

8. The manufacturing method of construction aggregates using incineration ash according to claim 1, wherein in the sixth step, a sixth conveyor for transferring the saggar and a dryer formed on the sixth conveyor are provided, and the dryer includes:
a slow cooling part, which is installed at a saggar introduction stage so as to preliminarily dry the basic elements including gravel and sand for construction aggregates before sintering and lowers the temperature of the basic elements including gravel and sand for construction aggregates to a temperature between 350-450° C.; and a drying part for drying the basic elements including gravel and sand for construction aggregates, slowly cooled by the slow cooling part, at a temperature of 100-150° C. for 60 to 100 minutes.

9. The manufacturing method of construction aggregates using incineration ash according to claim 8, wherein the drying part includes a water-cooling type-fin cooler and a fan filter unit in order to carry out cooling treatment including thermal and chemical annealing and to induce the release of water vapor and gas.

10. The manufacturing method of construction aggregates using incineration ash according to claim 1, wherein in the seventh step, a seventh conveyor for transferring the saggar and a firing kiln part formed on the seventh conveyor are provided, and the firing kiln part includes:
an input and preheating section for preheating the saggar to a predetermined temperature,
a temperature rising section for raising the temperature of the saggar to 1100-1200° C. after the input and preheating section;
a temperature maintaining section for constantly maintaining the temperature of the saggar raised through the temperature rising section;
a cooling section for cooling the saggar to a predetermined temperature or less after firing is progressed through the temperature maintaining section; and
a room temperature cooling and discharge section for discharging the saggar to the outside after cooling the saggar to room temperature after the cooling section.

11. The manufacturing method of construction aggregates using incineration ash according to claim 1, wherein in the eighth step, an exhaust gas reduction device is provided, and the exhaust gas reduction device is configured to reduce exhaust gas by using one of a combustion method, an adsorption method, an absorption method, a microorganism treatment method, an ozone oxidation method, and a cooling condensation method, or two or more thereof in combination in order to reduce harmful exhaust gas including carbon dioxide, nitrogen oxides and sulfur oxides produced during firing of the firing kiln part.

12. The manufacturing method of construction aggregates using incineration ash according to claim 1, wherein in the tenth step, a crusher and a separator are provided so that the crusher crushes the construction aggregate elements provided from the saggar and the separator separates the crushed construction aggregate elements discharged through the crusher into construction aggregate gravel and construction aggregate sand.

* * * * *

UNITED STATES PATENT AND TRADEMARK OFFICE
CERTIFICATE OF CORRECTION

PATENT NO. : 12,129,204 B2
APPLICATION NO. : 17/550550
DATED : October 29, 2024
INVENTOR(S) : Kil Won Seo Page 1 of 1

It is certified that error appears in the above-identified patent and that said Letters Patent is hereby corrected as shown below:

In the Claims

In Claim 9, Column 12, Line 10, please replace "type-fin" with --fin--.

Signed and Sealed this
Twenty-eighth Day of January, 2025

Coke Morgan Stewart
*Acting Director of the United States Patent and Trademark Office*